United States Patent
Haining

(10) Patent No.: US 6,906,831 B2
(45) Date of Patent: Jun. 14, 2005

(54) SCANNER DEVICE HAVING A SHEET HANDLING PATH WITH A REDUCED BENDING ANGLE

(75) Inventor: David S Haining, Greeley, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 587 days.

(21) Appl. No.: 09/741,241

(22) Filed: Dec. 18, 2000

(65) Prior Publication Data

US 2002/0075517 A1 Jun. 20, 2002

(51) Int. Cl.[7] .................................................. H04N 1/04
(52) U.S. Cl. ........................ 358/474; 358/471; 358/498; 358/509; 271/228; 271/279; 250/208.1; 250/234
(58) Field of Search ................................. 358/471–474, 358/498, 509, 516, 496, 487; 271/228, 233, 303, 279, 3.14, 4.01, 4.08, 10.01, 10.09; 250/208.1, 234, 205; 399/365, 367

(56) References Cited

U.S. PATENT DOCUMENTS

| 5,430,289 | A | * | 7/1995 | Erickson et al. | ............ 250/205 |
|---|---|---|---|---|---|
| 5,517,332 | A | * | 5/1996 | Barry et al. | ................ 358/496 |
| 5,532,839 | A | * | 7/1996 | Beikirch et al. | ............ 358/401 |
| 5,574,274 | A | * | 11/1996 | Rubley et al. | ........... 250/208.1 |
| 5,672,125 | A |   | 9/1997 | Ross |   |
| 5,673,125 | A | * | 9/1997 | Merecki et al. | ............. 358/487 |
| 5,788,227 | A | * | 8/1998 | Hendrix et al. | .............. 271/3.2 |
| 6,131,902 | A | * | 10/2000 | Takenaka et al. | ........... 271/303 |
| 6,252,684 | B1 |   | 6/2001 | Lin |   |

FOREIGN PATENT DOCUMENTS

GB    2 324 430    10/1998

OTHER PUBLICATIONS

U.S. Appl. No. 09/281,600, filed Mar. 30, 1999, Batten et al.

* cited by examiner

Primary Examiner—Mark Wallerson
Assistant Examiner—Heather D. Gibbs

(57) ABSTRACT

A photography scanning device is provided for automatically scanning either photographs or transparencies. The scanning device is provided with a sheet feeding and handling mechanism that does not bend a photo or transparency to a degree that it is damaged as it passes from a sheet feeding stack, to a scanning station, and on to a sheet receiving stack.

25 Claims, 7 Drawing Sheets

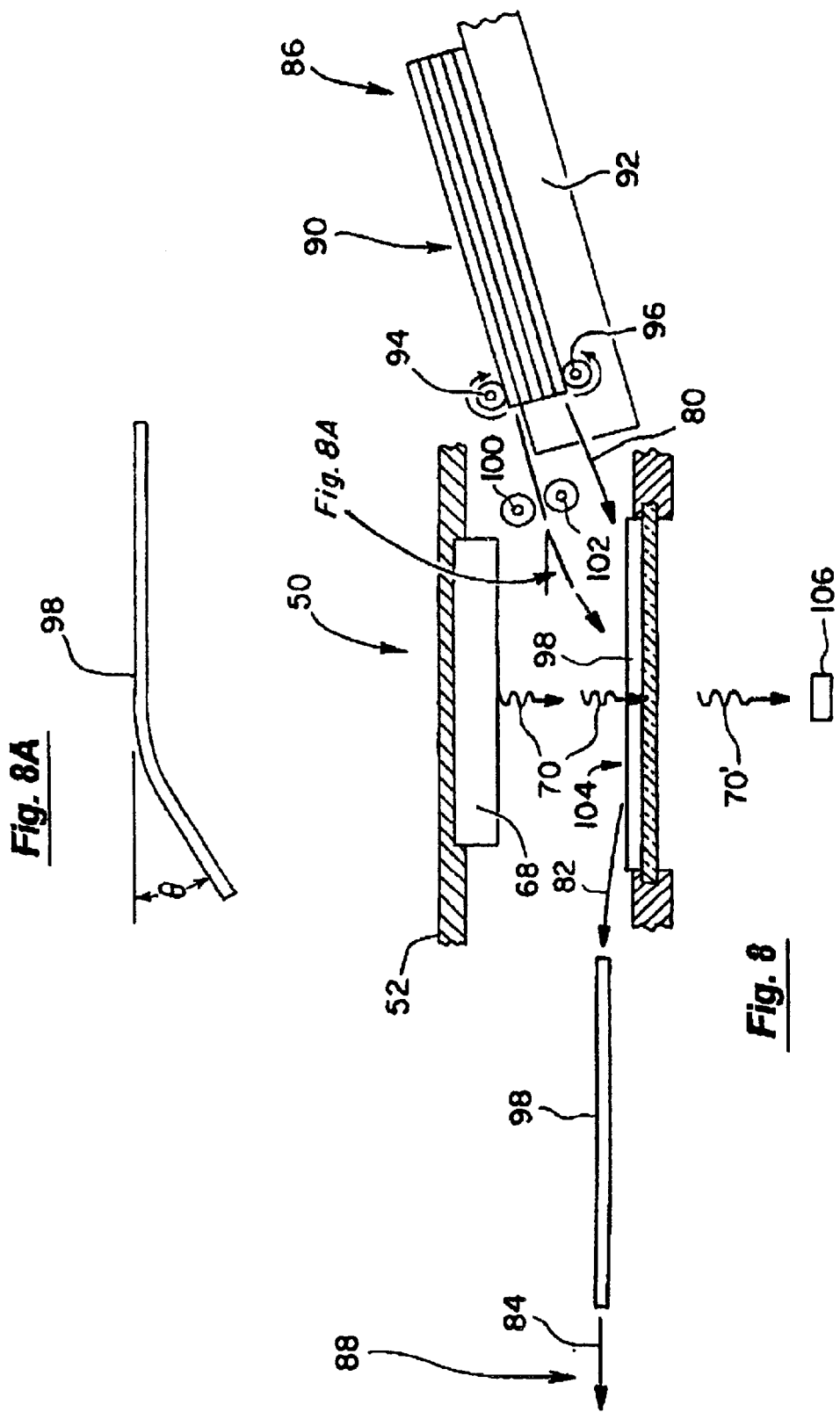

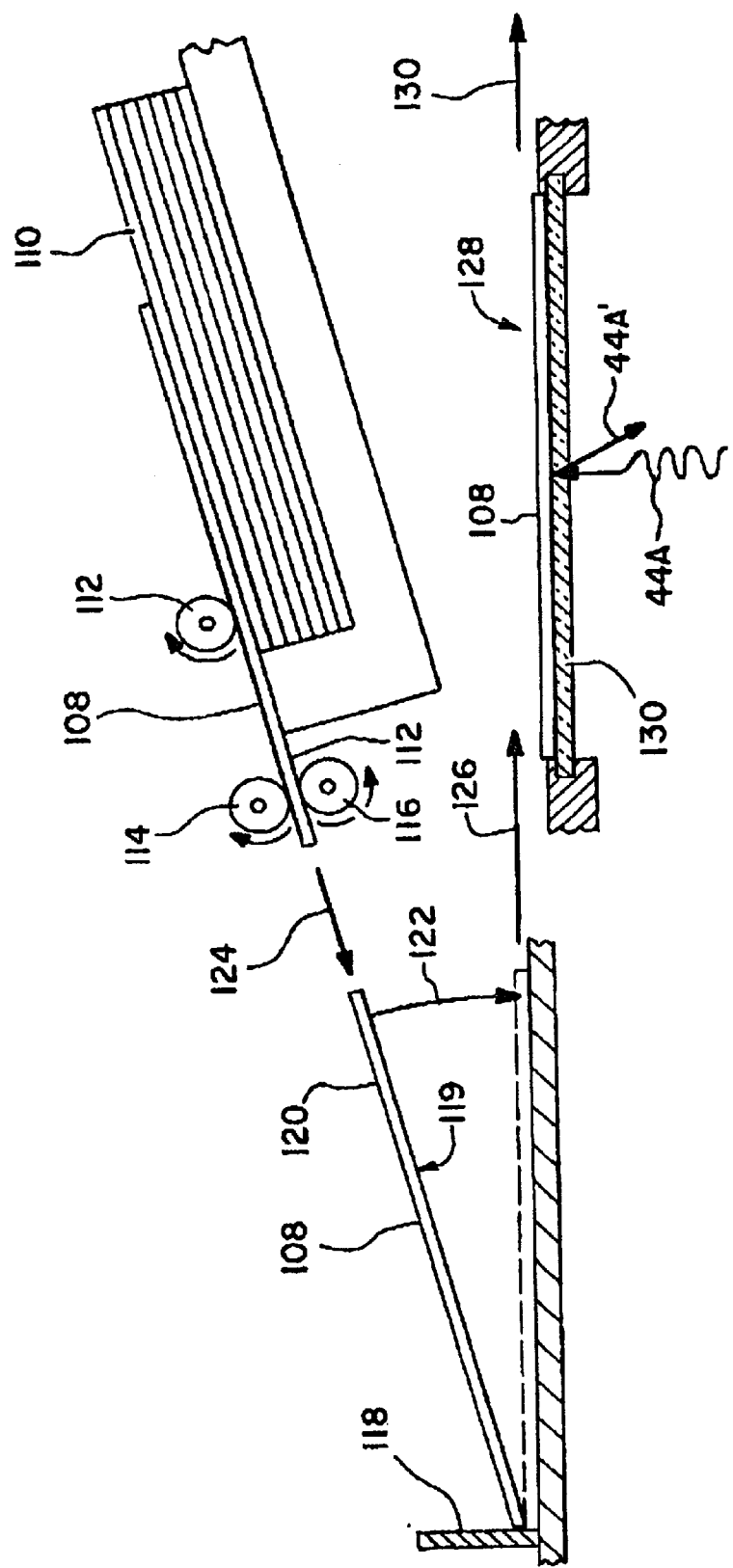

SCANNER DEVICE HAVING A SHEET HANDLING PATH WITH A REDUCED BENDING ANGLE

BACKGROUND OF THE INVENTION

1. Field of the Invention

This invention generally relates to electrophotographic scanning of photographic images (photographs and photo transparencies such as 35 mm slides). More particularly, this invention is concerned with the use of desktop scanners capable of scanning either photographs or photo transparencies.

2. Description of Related Art

Desktop scanning units employed to electrophotographically scan sheets of paper bearing printed information usually employ automatic paper feeder mechanisms. Such mechanisms pick individual sheets of paper from a stack and then insert them into the lid of the scanner unit. Upon entering the scanner unit, a given sheet of paper is transported along tightly curved paths to a flat scanning window. After being scanned, the sheet of paper is sent to an output tray. The bending that a sheet of paper undergoes in such scanning units does not, to any unacceptable degree, damage the sheet-like quality of the paper, or the quality of the printing contained thereon.

Thirty five millimeter slides, however, and especially those mounted in cardboard frames, are damaged when they experience severe bending. Moreover, transparencies such as 35 mm slides can not be electrophotographically scanned in the same manner that photographs and sheets of paper are scanned. Transparencies must be scanned with a light source that comes from above the transparency and selectively passes through it. These rays fall upon photodetectors which transduce varying light intensities into varying voltage signals. Conversely, photos and sheets of paper are scanned with a light source whose rays come from below the photo or sheet of paper, impinge on an object contained on the photo or sheet of paper and then are reflected back to a photodetector.

Hence, many users of desktop type scanners are forced to employ three separate and distinct pieces of desktop space-requiring equipment: (1) a paper scanner whose lid has an automatic paper feeder mechanism and a curved sheet transport path, (2) a flatbed scanner for photographs that are loaded into and removed from such scanners by hand and (3) a flatbed scanner for transparencies that are likewise loaded and removed by hand. To some extent this equipment requirement has been alleviated through use of hand operated accessory equipment that provides light (from above) to a single transparency. Such transparency-holding accessories are placed on the window of a electrophotographic scanner whose primary function is to scan sheets of paper bearing printed information. These hand operated devices are (1) limited in the size of the transparency they can handle, (2) not capable of automatically feeding a stack of transparencies into a scanner and (3) tiring to use when several transparencies must be scanned in a relatively short period of time.

SUMMARY OF THE INVENTION

The present invention provides a desktop scanner having the capability of electrophotographically scanning either photographs or transparencies (e.g., 35 mm slides) using the same accessory scanner device—without using different accessories. No handheld accessories are needed to position and/or provide light for the transparencies. This scanner device also processes a stack of photos, or a stack of transparencies, in an automatic fashion without bending them to any unacceptable degree. These advantages are obtained by applicant's combined use of a scanner lid having a light source suitable for scanning transparencies, sheet transport paths that are capable of safely handling photographs and an automatic sheet feeding mechanism suitable for handling photos or transparencies.

BRIEF DESCRIPTION OF THE DRAWINGS

FIG. 8 shows a cross-sectional view of a preferred transport path followed by a photo or 35 mm slide in going to and from a scanning station in applicant's photography scanner.

FIG. 9 is a cross-sectional view of another preferred transport path followed by a photo or 35 mm slide in going to and from a scanning station.

DETAILED DESCRIPTION OF THE INVENTION

Figure 1:
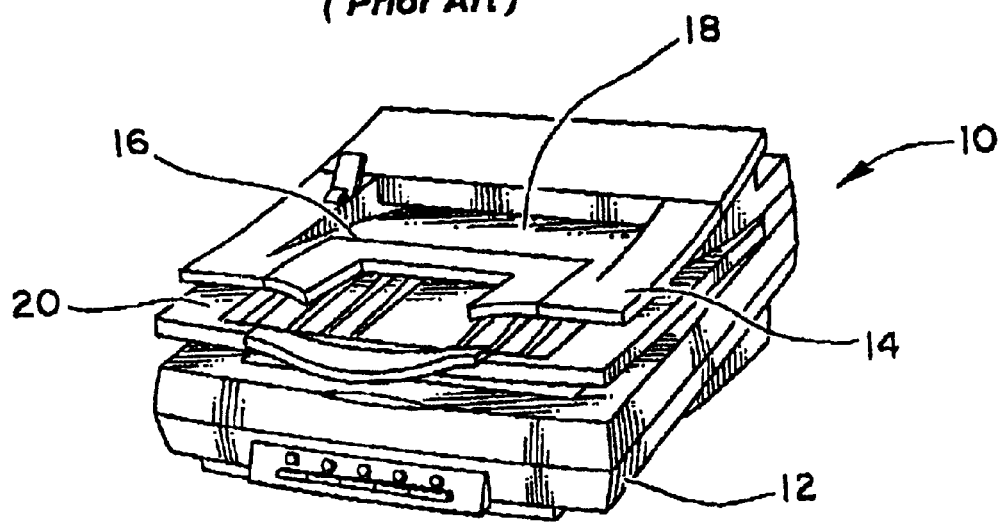
FIG. 1 is a perspective view of a prior art paper scanner.

FIG. 1 is a front perspective view of a prior art paper scanner device 10. It is generally comprised of a base 12 and a lid 14 whose rear side is attached to the base 12 by a hinge mechanism (not shown). The base 12 contains the electrophotographic components (not shown) needed to perform an electrophotographic scanning operation on an individual sheet of paper. The front of the lid 14 contains a paper feed tray 16 that mechanically cooperates with a paper feed mechanism that serves to insert individual sheets of paper (not shown) taken from a stack of papers (not shown) into a paper feed port 18 in the lid 14. Upon entering the paper feed port 18, an individual sheet of paper is transported to a photo scanning station located in the base 12. This paper transportation is done in the manner generally indicated in FIG. 2. Upon being scanned, the sheet of paper is conveyed into a collection tray 20 positioned under the paper feed tray 16 located in the front of the lid 14.

Figure 2:
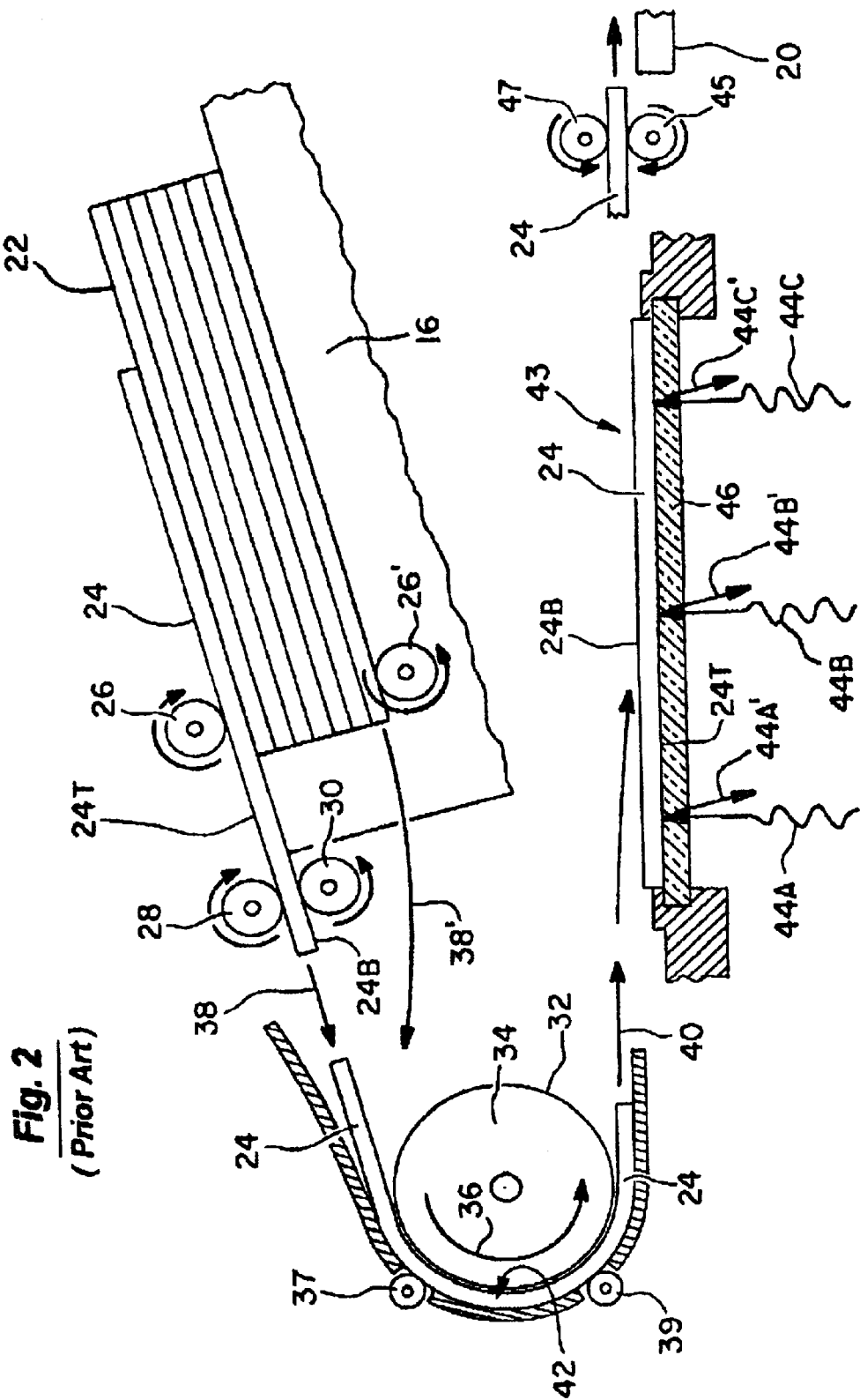
FIG. 2 is a generalized view of a curved path that a sheet of paper travels in prior art paper scanners such as that shown in FIG. 1.

FIG. 2 is a side view of various sheet handling operations that can be carried out in the lid 14 and base 12 depicted in FIG. 1. These operations begin with a stack 22 of paper being placed in the paper feed tray 16. An individual sheet 24 of that paper, having a top side 24T (which contains printed information to be scanned) and a bottom side 24B, is shown being removed from the stack 22 by a sheet acquisition device (such as the pick roller 26 shown in FIG. 2). Such a sheet of paper could just as well be removed from the bottom of the stack 22. This circumstance is generally depicted by the operation of a pick roller 26' shown positioned at the front end of the bottom of the stack 22. In either case, the removed sheet of paper 24 is conveyed, by sheet transport devices (such as sheet transport rollers 28 and 30), to the outside surface 32 of a cylindrical, powered, roller 34 turning in the direction generally suggested by arrow 36.

In going from the leftward transport path suggested by arrow 38 (or arrow 38') to the rightward path suggested by arrow 40, the sheet of paper 24 is heavily curled to a contour 42 that generally conforms to the circular contour 32 of the powered roller 34. This curling action is aided by use of idler rollers 37 and 39. Since such powered rollers 34 are usually less than about three inches in diameter, a sheet of paper 24 is severely curled as it passes over the outside surface 32 of such a powered roller 34. This powered roller 34 operation also turns over the sheet of paper 24. That is to say that the top side 24T of the sheet 24 taken from stack 22 has become the bottom side of said sheet 24 as it leaves the cylindrical roller 34 and is directed to a scanning station 43. The scanning station 43 positions the sheet of paper 24 so that information printed on the now "bottom side" (side 24T) can be scanned by light rays 44A, 44B, 44C, etc. These light rays pass through a glass or clear plastic window 46 upon which sheet 24 flatly rests in the scanning station 43. After the scanning operation has been completed, the sheet 24 is conveyed (e.g., by transport rollers 45 and 47) to a sheet collection tray 20 such as that shown in FIG. 1.

Sheet handling devices such as that shown in FIG. 2 are not suited to scanning 35 mm slides or other transparencies. This unsuitability has two main aspects. The first is that a photo should not be curved or bent (especially to the severe degree sheet 24 is shown being bent in FIG. 2 as it is rolled over the outside surface 32 of cylindrical, powered roller 34) without severely and permanently damaging its photographic image. Hence, photos are normally set in a separate and distinct flatbed photograph scanning device by hand. After being scanned, they are removed in the same manner. Regardless of its method of loading, such photograph scanning devices are separate and distinct pieces of equipment that take up valuable desktop space.

Slides, and especially 35 mm slides mounted in cardboard/plastic frames, also suffer from undergoing bending actions such as those shown in FIG. 2. Moreover, in order to scan 35 mm slides, photo negatives, x-rays and other transparencies, they must be placed under a light source that originates from above the transparency and then passes through the transparency in rays of varying intensities. The resulting light rays fall on photodetector devices that convert said light rays into voltage signals. Thus, scanning equipment such as that shown in FIG. 2 that originate their scanning light rays from below the object being scanned (e.g., light rays 44A, 44B, 44C, etc., emanating from below sheet 24) can not be used to scan 35 mm slides, photo negatives, x-rays and other transparencies. Therefore, separate and distinct pieces of equipment also are used to scan transparencies. These transparency scanners also occupy valuable desktop space. In the alternative, transparencies are scanned through use of accessory scanners or separately dedicated scanners.

Figure 3:
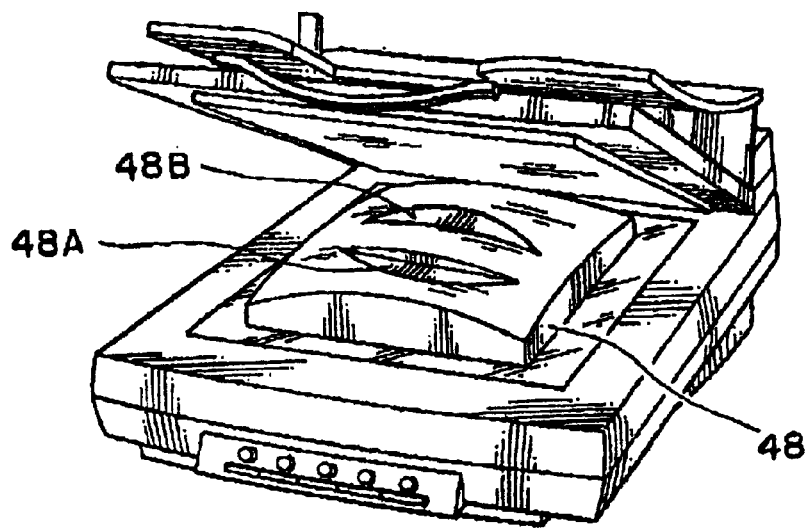
FIG. 3 shows a prior art accessory for scanning transparencies that are placed on the window of a paper scanner such as that shown in FIG. 1.

FIG. 3 shows the scanner device of FIG. 1 further provided with an accessory for scanning transparencies. This transparency accessory 48 produces light that passes from the top of said accessory 48 downward through a transparency positioned between the scanner unit's window (see item 46 of FIG. 2) and the light source of the transparency accessory 48. With aid of finger grips 48A and 48B, such a transparency accessory 48 can be lifted by the user and positioned over the transparency in operations that require some degree of manual dexterity and/or hand strength. This manual action must be repeated for each transparency. Hence, this method of scanning transparencies can become a tiring task if there are more than just a few transparencies to be scanned in a relatively short period of time. The size of the transparencies that can be scanned by such an accessory 48 is also somewhat limited.

Figure 4:
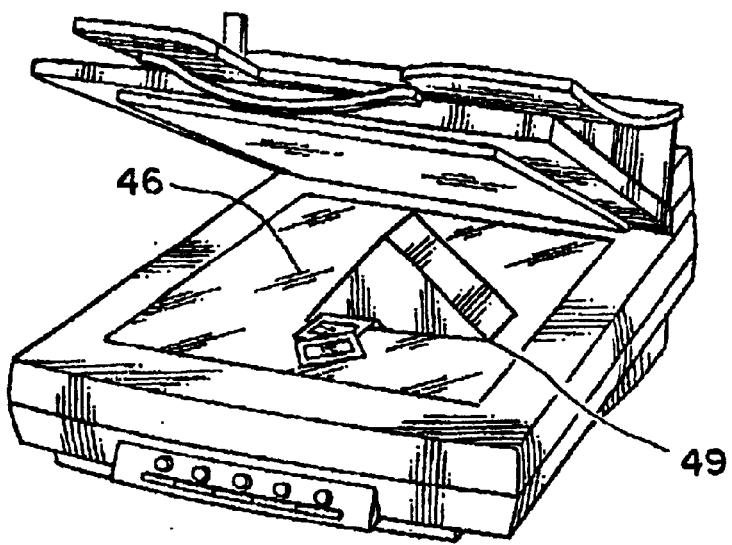
FIG. 4 shows another prior art accessory for scanning 35 mm slides placed that are on the window of the paper scanner such as that shown in FIG. 1.

FIG. 4 depicts a second accessory 49 that is specially adapted to handle 35 mm slide transparencies mounted in cardboard frames. It too, must be manually operated for each individual slide scanning operation.

Figure 5:
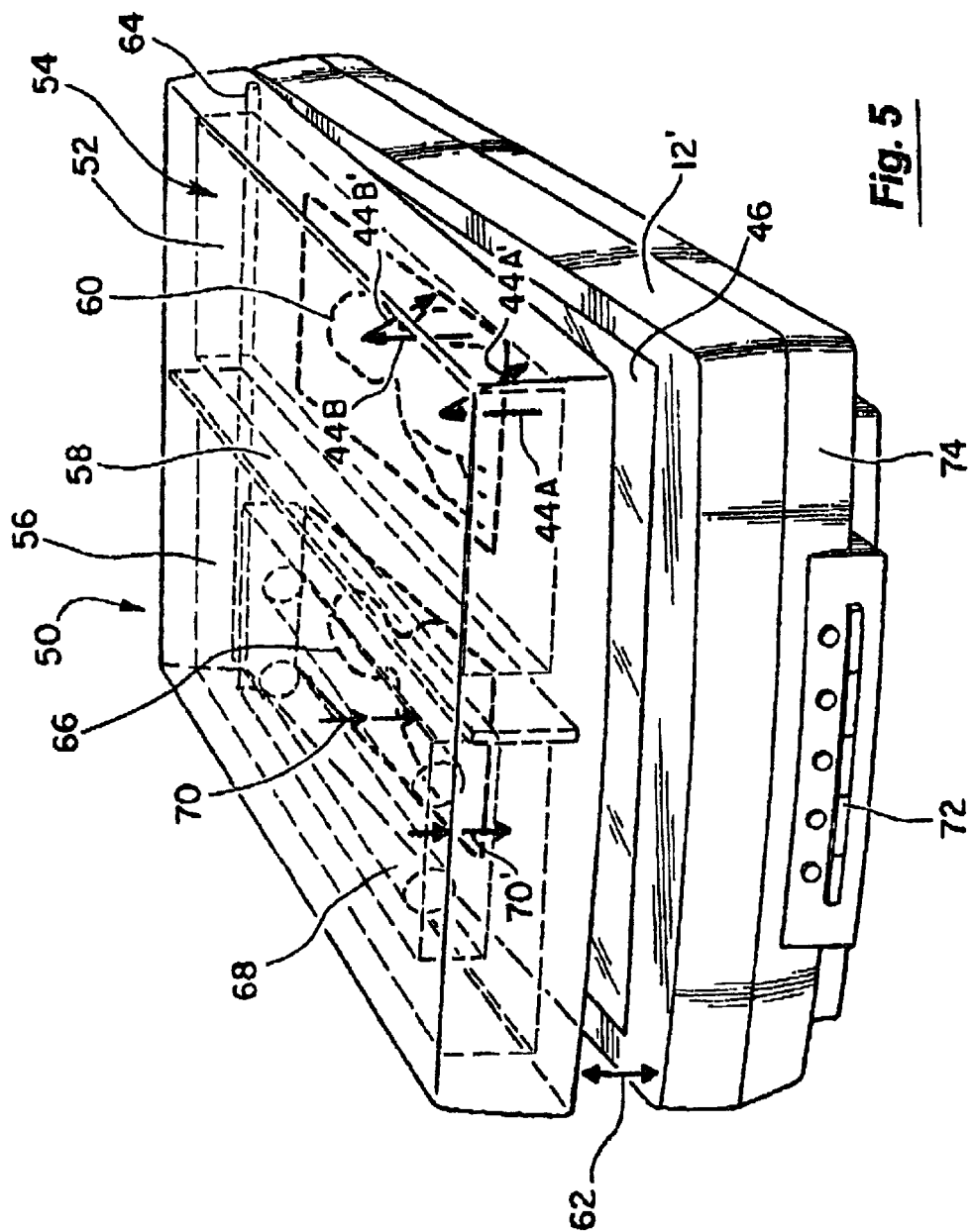
FIG. 5 is a front perspective, partially phantom, view of a photography scanner of this patent disclosure.

FIG. 5 shows a perspective view of a photography scanner 50 constructed according to the general teachings of this patent disclosure. Several of its lid components are shown in phantom lines in order to better illustrate some of its more important internal features. The base 12' of the photography scanner 50 is comparable to the base 12 of the paper scanner device 10 shown in FIG. 1. Indeed, in some embodiments of this invention, the very same base (i.e., base 12' of FIG. 5 or base 12 of FIG. 1) can be used in applicant's photography scanner 50 as part of an equipment package hereinafter more fully described.

Be that as it may, FIG. 5 shows applicant's photography scanner device 50 provided with a lid 52 having an inner cavity that is separated into two compartments 54 and 56 by a partition 58. This partition 58 is located near the center of the lid 52. The compartment 54 to the right of partition 58 is shown dedicated to scanning photographs. Thus, a photograph 60 is shown located in a scanning position in compartment 54. It will be understood that the photograph 60 is to be placed "face down" on the scanning window 46 of base 12'. The face side of the photograph 60 will therefore receive upwardly directed light rays such as ray 44A and these rays will be reflected off certain areas of the photo as reflected rays (such as reflected ray 44A').

Such reflected rays (e.g., reflected ray 44A') are detected by photosensor arrays located below the scanning window 46 of base 12'. Each individual photosensor in such an array will respond to the light intensity produced by a pixel location on a scan line that is optically associated with a given photosensor. The photosensor response is transduced into a data signal (usually a voltage signal) whose intensity is proportional to the intensity of the light that the photosensor experiences during an interval of time called a "sampling interval". A plurality of such data signals from the array of photosensors is then processed by data processing systems well known to the electrophotography scanning arts.

Charge coupled photosensors can be employed by the photography scanners of this patent disclosure. A charged coupled photosensor is a single semiconductor chip with at least one linear array of photosensors associated with it. Since a chip is normally much smaller than a desired scan line, the object's image must be focused onto the charged coupled device. Optical scanners using charged coupled devices therefore usually require an extended focal length between the object being imaged and the charged coupled device. The base 12' of applicant's photography scanner will be deep enough to provide such extended focal lengths. Moreover, the base 12' may contain some photosensors suitable for receiving and transducing rays passed through a transparency and other photosensors better suited to receiving and transducing light rays reflected from photographs.

Contact image sensors are linear arrangements of optical arrays. Each linear optical array has a corresponding linear array of photosensors associated with it. The linear optical arrays are usually positioned close to a lens which, in turn, is positioned close to the object to be scanned. The lens receives light reflected from the object and focuses a scan line portion of the imaged object onto an array of photosensors. The photosensors produce voltage signals that correspond to the intensity of the light they receive. As in the case of charge coupled photosensors, data from an array of photosensors in a contact image photosensor is then processed by a computer in ways that also are well known to those skilled in the electrophotographic scanning arts. Such a computer can be located in the base 12', or the scanner 50 may employ an external computer for this purpose. Those skilled in this art also will appreciate that charge coupled photosensors and contact image photosensors can each be adapted to receive rays that pass through a transparency or rays that are reflected off of a photograph.

Be that as it may, the photograph 60 shown in FIG. 5 could be placed in compartment 54 by lifting the scanner lid 52 in the upward rotating direction suggested in FIG. 5 by arrow 62. This is made possible by virtue of the fact that the lid 52 is mounted to the base 12' by a hinge mechanism 64 located at the respective rear ends of the lid 52 and the base 12'. In the more preferred embodiments of this invention, however, the photos will be taken into the scanner 50 by means of an automatic sheet acquisition device. Preferably, such an automatic sheet acquisition device will handle a photo from its edge regions.

The left compartment 56 of lid 52 is shown in FIG. 5 dedicated to scanning transparencies such as 35 mm slides. To this end, a slide 66 is shown positioned in compartment 56 under an overhead light source 68. This overhead light source 68 produces rays of light (e.g., ray 70) that pass downward through the slide 66 and become light rays (e.g., ray 70') that are altered by virtue of having passed through a portion of the slide 66. Such an altered ray 70' (and many others like it that collectively produce an image) can be detected by arrays of photosensors located under a scanner window 46 in the base 12' of the photography scanner device 50. These photosensors can be coupled photosensors. As in the case of photographs, the path followed by a transparency will not have any severe bend angles.

Thus, the device 50 shown in FIG. 5 is equipped to carry out two scanning functions that formerly were carried out by two distinct kinds of scanner accessories—automatic document feeder and transparency adapter, or by use of hand operated transparency accessories such as those shown in FIGS. 3 and 4. Electrical circuitry (not shown) associated with the herein disclosed photography scanner device 50 can be used to select which scanning function will be used (i.e., photograph scanning in compartment 56, or transparency scanning in compartment 54). Such circuitry can be controlled by use of a selection button 72 located on the face 74 of the photography scanner device 50 or on the accessory itself.

Figure 6:
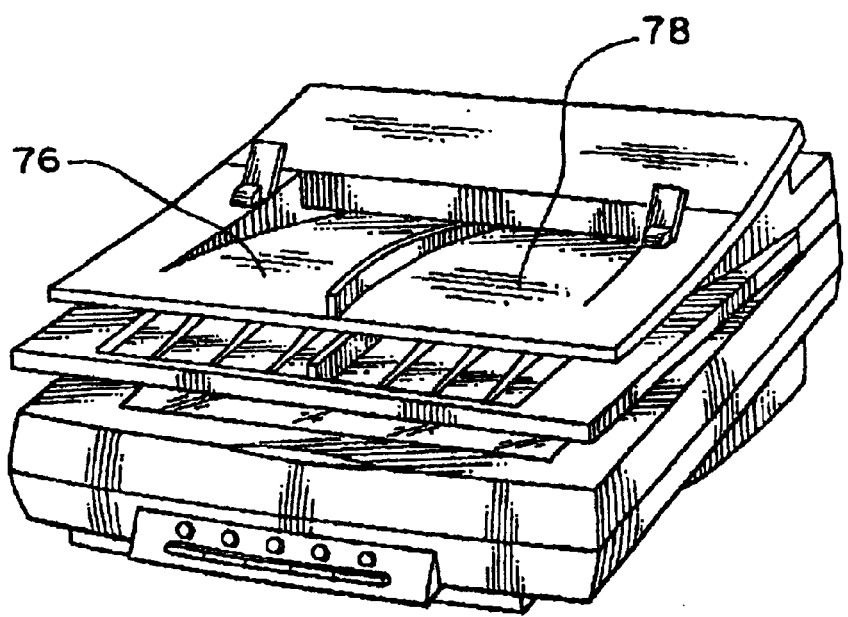
FIG. 6 is a front perspective view of a photography scanner of this patent disclosure shown provided with a photo feeder and a transparency feeder.

FIG. 6 depicts the photography scanner device 50 shown in FIG. 5 provided with two separate and distinct document dispensing trays 76 and 78. Each of these trays slopes downward so that a stack of photos or a stack of transparencies (e.g., a stack of 35 mm slides), placed in the appropriate tray, is urged (under the influence of gravity) toward their respective receiving ports. A sheet acquisition mechanism (e.g., pick rollers) is positioned in each receiving port in order to pull on edge regions of a photo (or one transparency) and thereby remove it from the top (or bottom) of a stack. The image on the photo (or transparency) may be scanned and the data gained from such scanning can then be processed, e.g., stored in a computer, put on display on a computer monitor or transmitted, in ways well known to this art.

Figure 7:
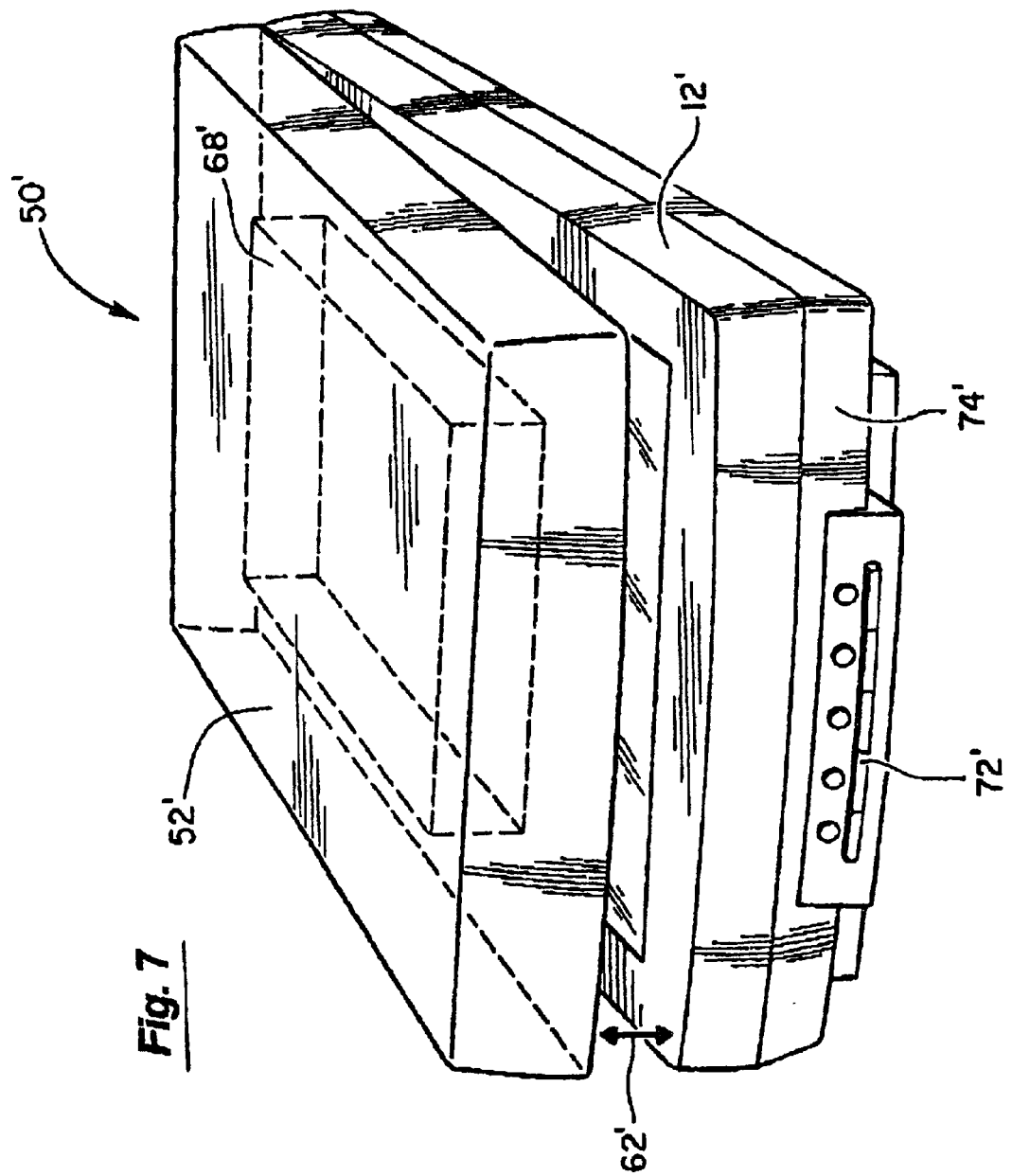
FIG. 7 is a front perspective, partially phantom, view of another embodiment of a photography scanner device of this patent disclosure.

FIG. 7 depicts an alternative embodiment of this invention wherein the scanner 50' is provided with a lid 52' that contains just one compartment and wherein that compartment is provided with an overhead light source 68' for scanning transparencies. Thus, a selector button 72' in the front face 74' of the base 12' would be used to determine whether the object being scanned should be provided light from above (for scanning a transparency) or provided with light from below (for scanning a photo). This alternative embodiment of applicant's photography scanner invention would therefore need only one automatic feeding mechanism. In other words, the same automatic feeding mechanism could feed a stack of photos or a stack of transparencies into the scanner 50'. Once the mode of operation was selected by the user, the scanner 50' would send scanner light from above or from below as required.

Thus, in their most generalized embodiments, the photography scanners of this patent disclosure will comprise a base and a lid connected to said base by a hinge and wherein: (1) the lid has a light source suitable for illuminating a transparency and an automatic sheet feeding mechanism; (2) the base has a scanning station, a light source suitable for illuminating a photograph and an array of photodetectors suitable for converting light rays into data signals; and (3) the sheet transport path has no sheet bending angle that would damage slides or photos.

FIG. 8 depicts a preferred sheet flow path 80, 82, 84 for the practice of this invention. It generally runs from the front 86 of the photography scanner 50 to its rear 88. A stack of transparencies 90 is shown stacked in a feed tray 92 generally located at the front end of the photography scanner 50. These transparencies can be removed from the top or bottom of the stack 90 by a sheet picking device exemplified by a top pick roller 94. They can also be removed from the bottom of the stack by a bottom pick roller 96. FIG. 8 shows a transparency 98 that has been taken from stack 90, sent through transport rollers 100/102 and delivered to a work station 104. In this sheet transport operation, the transparency 98 is not bent to a degree that would damage it, or a photo. Preferably such a transparency (or photo) will not be bent to any angle that is greater than about 75°. This bending angle limitation is generally depicted in detail in FIG. 8A as a bend angle theta experienced by sheet 98. Bend angles theta less than 30° are even more preferred. Indeed, in some of the more preferred embodiments of this invention, photos and transparencies will remain substantially flat during all sheet handling operations. In any case, the transparency shown in FIG. 8 receives light rays 70 from a light source 68 located in the inside roof region of lid 52 of the device 50 shown in FIG. 5 (or from a light source 68' shown in the alternative scanner shown in FIG. 7). Such a light ray 70 will pass through the transparency 98 and, in so doing, become an altered ray 70' that is detected by a photosensor array 106. These photosensors may be charged coupled photosensors or contact image photosensors. Again, data signals from arrays of such photosensors are obtained and processed in ways well known to the electrophotography arts.

After the scanning operation is completed, the transparency 98 is removed from the work station via path 82 and 84. Thus, the overall transport path 80, 82 and 84 is distinguished from the paper transport path depicted in FIG. 2 in that the transparency (or photograph) shown in FIG. 8 is not bent around a roller such as the powered roller 34 shown in FIG. 2. Thus, since path 80, 82, 84 has no severe bends (e.g., those greater than about 450), the transparency (or photo) is not damaged. To this end this sheet transport path leads from the front 86 of the photography scanner to its rear 88 in a substantially linear manner. The rear 88 of the device 50 can include a sheet stacking mechanism (not shown).

FIG. 9 shows an alternative sheet transport path for the practice of this invention. In this representation, the subject sheet may be regarded as a photograph 108 removed from a stack 110 of photographs by a pick roller 112. The photograph 108 is shown being sent, face side 112 down, in an inclined, but substantially straight, path (via transport rollers 114 and 116) until it encounters a stop 118. This stopping action causes the rear of the sheet 120 to fall downward in the manner generally suggested by direction arrow 122. Thus, the photograph has not experienced any severe bending actions in changing from a leftward flow direction 124 to a rightward flow direction 126 (as it did in the paper handling system shown in FIG. 2). Thereafter, the face side 112 down photograph 108 is delivered to work station 128, scanned by rays such as ray 44A which is reflected as ray 44A' to a photosensor device (not shown). The photograph 108 is then removed from the work station 128 and sent in the substantially straight path suggested by arrow 130 to a collection tray (not shown). Thus, in following the flow path 124, 126, and 130, the photograph 108 is not subjected to any severe bending actions (e.g., bends greater than about 45°).

In some of the preferred embodiments of this invention, the hinge device 64 that connects the lid 52 to the base 12' of applicant's scanners will be so constructed that the lid 52 can be readily removed from the base 12'. For example, the lid 52 could be removed from the base 12' and the lid 14 shown in FIG. 1 connected to the base 12' (shown in FIG. 5) in place of lid 52. Thus, the same base 12' shown in FIG. 5 (or base 12 shown in FIG. 1) can be used for the photography scanner 50 of this patent disclosure—or for the paper scanner shown in FIG. 1. This creates the possibility of a three piece scanner package having one base and two interchangeable lids (a paper feed lid, and a transparency/photo feed lid) such that the three piece equipment package can be used to scan papers, or photographs or transparencies that can each be automatically fed into a scanner station in the base 12. To this end, a first lid (e.g., containing a light for illuminating a transparency) and a second lid (e.g., a lid having a curved path over which sheets of paper travel) are each provided with a hinge/lock mechanism that can mechanically cooperate with a receiver hinge/lock mechanism in the base 12'.

The foregoing description of the present invention has been presented for purposes of illustration and description only. It is not intended to be exhaustive or to limit the invention to the precise forms disclosed herein. Other modifications and variations may be possible in light of the foregoing teachings. For example, pick roller type sheet acquisition devices, and opposing rollers were used to illustrate sheet transport mechanisms. This was done by way of example only in order to explain the principles of this invention and its practical application. Other sheet transport devices such as wide band belts could just be well be employed for such sheet transport purposes. Thus, the appended claims can be construed to include other alternative embodiments of this invention not otherwise limited by the prior art.

I claim:

1. A photography scanner comprising a base and a lid connected to said base by a hinge and wherein:

the lid has a light source suitable for illuminating a transparency and an automatic sheet feeding mechanism;

the base has a scanning station, a light source suitable for illuminating a photograph and an array of photodetectors suitable for converting light rays into data signals; and a sheet handling path having no sheet bending angle that damages a transparency or photograph, wherein the sheet handling path effects a sheet bend angle of less than 45°.

2. The photography scanner of claim 1 wherein the lid contains two automatic sheet feeding mechanisms one of which is dedicated to automatically feeding photos and the other dedicated to automatically feeding transparencies.

3. The photography scanner of claim 1 wherein the sheet enters the scanner from its front and exits the scanner from its rear.

4. The photography scanner of claim 1 wherein the sheet exits the scanner from its front.

5. The photography scanner of claim 1 wherein the photodetectors are charge coupled photosensors.

6. The photography scanner of claim 1 wherein the base has an array of photodetectors suitable for receiving light rays reflected from a photo and transducing them into data signals and another array of photodetectors suitable for receiving light rays that have passed through a transparency and transducing them into data signals.

7. A photography scanner comprising a base and a lid connected to said base by a hinge and wherein:

the lid has a light source suitable for illuminating a transparency and an automatic sheet feeding mechanism;

the base has a scanning station, a light source suitable for illuminating a photograph and an array of photodetectors suitable for converting light rays into data signals; and a sheet handling path having no sheet bending angle that damages a transparency or photograph wherein the lid contains two compartments, one of which is dedicated to scanning transparencies and the other dedicated to scanning photograph.

8. A photography scanning device having a base and a lid connected to said base by a hinge and wherein:

the lid has two compartments, one which has a light source suitable for illuminating a transparency and a separate and distinct automatic sheet feeding mechanism associated with each of the two compartments;

the base has a scanning station, a light source suitable for illuminating a photograph and an array of photodetectors suitable for converting light rays into data signals; and a sheet handling path having no sheet bending angle that damages a transparency or a photograph.

9. The photography scanner of claim 8 wherein the base has an array of photodetectors suitable for receiving light rays reflected from a photograph and transducing them into data signals, and another may of photodetectors suitable for receiving light rays that have passed through a transparency and transducing them into data signals.

10. The photography scanner of claim 8 wherein the photodetectors are charge coupled photosensors.

11. The photography scanner of claim 8 wherein a sheet exits the scanner from its rear.

12. The photography scanner of claim 8 wherein a sheet exits the scanner from its front.

13. A photography scanner/paper scanner comprising a base and a first lid connected to said base by a binge and wherein:

the lid has a light source suitable for illuminating a transparency and an automatic sheet feeding mechanism;

the base has a scanning station, a light source suitable for illuminating a photograph and an array of photodetectors suitable for converting light rays into data signals;

a sheet handling path having no sheet bending angle that damages a transparency or photograph; and a second lid not attached to the base when the first lid is attached to the base and wherein said second lid has an automatic paper feeding device.

14. The photography scanner of claim 13 wherein the first lid contains two automatic sheet feeding mechanisms one of which is dedicated to automatically feeding photos and the other dedicated to automatically feeding transparencies.

15. The photography scanner of claim 13 wherein the first lid contains one compartment whose roof region is provided with a source suitable for scanning transparencies.

16. The photography scanner of claim 13 wherein a sheet placed in the first lid travels through the scanner and exits the scanner from its rear.

17. The photography scanner of claim 13 wherein a sheet placed in the first lid travels through the scanner and exits the scanner from its front side.

18. The photography scanner of claim 13 wherein the second lid has an automatic paper feeding mechanism.

19. A scanner device comprising:

a base providing a work surface that is disposed intermediate a scanner front from which a document to be scanned enters the work surface and a scanner rear at which a scanned document is delivered; and a feeder tray disposed at an incline to the work surface and between the scanner front and the work surface, the feeder tray to dispense a document sheet to be scanned to the work surface, wherein the feeder tray and the work surface effect a bend angle of less than 45° in a transport path from the scanner front to the scanner rear.

20. A scanner device as defined in claim 19, further comprising:

a transport roller disposed in the transport path between the feeder tray and the work surface.

21. A scanner device as defined in claim 20, further comprising:

a pick roller to remove a document from a stack supported by the feeder tray.

22. A scanner device comprising:

a base providing a work station;

a feeder tray disposed substantially directly above the work station at an incline to the work station; and a stop disposed in a flow path of a sheet to be dispensed from the feeder tray to the work station to be scanned.

23. A scanner device as defined in claim 22, further comprising a transport roller disposed between the feeder tray and the stop, the transport roller effective to direct a document sheet from the feeder tray to the stop.

24. A scanner device as defined in claim 23, wherein the feeder tray, the transport roller mechanism, and the stop are operable to effect a flow path that extends initially in a first direction and subsequently in a second direction in a manner that subjects a document sheet to no severe bending action.

25. A scanner device as defined in claim 24, wherein the feeder tray, transport roller mechanism, and stop are operable to effect a flow path that subjects a document sheet to bending action no greater than 45°.

* * * * *

UNITED STATES PATENT AND TRADEMARK OFFICE
CERTIFICATE OF CORRECTION

PATENT NO. : 6,906,831 B2  Page 1 of 1
APPLICATION NO. : 09/741241
DATED : June 14, 2005
INVENTOR(S) : David S. Haining It is certified that error appears in the above-identified patent and that said Letters Patent is hereby corrected as shown below:

In column 7, line 1, delete "450" and insert -- 45° --, therefor.

In column 8, line 37, in Claim 7, after "photograph" insert -- , --.

In column 8, line 40, in Claim 7, delete "photograph" and insert -- photographs --, therefor.

In column 8, line 56, in Claim 9, delete "may" and insert -- array --, therefor.

In column 8, line 66, in Claim 13, delete "binge" and insert -- hinge --, therefor.

In column 9, line 18, in Claim 15, insert -- light -- before "source".

Signed and Sealed this

Fifth Day of May, 2009

JOHN DOLL
*Acting Director of the United States Patent and Trademark Office*